US012049131B2

(12) United States Patent
Kimura et al.

(10) Patent No.: US 12,049,131 B2
(45) Date of Patent: Jul. 30, 2024

(54) ELECTRIC TRUCK FRAME

(71) Applicant: Daimler AG, Stuttgart (DE)

(72) Inventors: Kiyoshi Kimura, Kawasaki (JP); Shigeru Okonogi, Kawasaki (JP)

(73) Assignee: Daimler Truck AG, Leinfelden-Echterdingen (DE)

( * ) Notice: Subject to any disclaimer, the term of this patent is extended or adjusted under 35 U.S.C. 154(b) by 324 days.

(21) Appl. No.: 17/613,262

(22) PCT Filed: Mar. 31, 2020

(86) PCT No.: PCT/JP2020/014783
§ 371 (c)(1),
(2) Date: Nov. 22, 2021

(87) PCT Pub. No.: WO2020/241036
PCT Pub. Date: Dec. 3, 2020

(65) Prior Publication Data
US 2022/0219522 A1    Jul. 14, 2022

(30) Foreign Application Priority Data

May 31, 2019 (JP) .................................. 2019-102396

(51) Int. Cl.
*B60K 1/04* (2019.01)
*B62D 21/02* (2006.01)
*B62D 21/09* (2006.01)

(52) U.S. Cl.
CPC ................ *B60K 1/04* (2013.01); *B62D 21/02* (2013.01); *B62D 21/09* (2013.01)

(58) Field of Classification Search
CPC ........... B60K 1/04; B62D 21/02; B62D 21/09
See application file for complete search history.

(56) References Cited

U.S. PATENT DOCUMENTS

| 10,421,345 B2 | 9/2019 | Kerspe et al. |
| 2015/0114735 A1 | 4/2015 | Buschjohann et al. |

(Continued)

FOREIGN PATENT DOCUMENTS

| CN | 104884288 A | 9/2015 |
| CN | 106794751 A | 5/2017 |

(Continued)

OTHER PUBLICATIONS

Japanese Office Action issued in Japanese application No. 2019-102396 dated Nov. 2, 2022, with English translation (Eight (8) pages).

(Continued)

*Primary Examiner* — Jacob B Meyer
(74) *Attorney, Agent, or Firm* — Crowell & Moring LLP

(57) ABSTRACT

An electric truck frame of an electric truck driven by electric power supplied from a battery includes a pair of side rails supporting a cab that are coupled by a plurality of cross members. The battery is disposed between the pair of side rails at a rear side of the cab. The pair of side rails include a plurality of elastic support sections that elastically support both ends of the battery in an electric truck width direction in a battery region in which the battery is disposed between the pair of side rails. The plurality of cross members are prohibited from being placed in the battery region.

5 Claims, 4 Drawing Sheets

(56) References Cited

U.S. PATENT DOCUMENTS

| | | | |
|---|---|---|---|
| 2022/0111910 A1* | 4/2022 | Hirota | B62D 25/025 |
| 2022/0158267 A1* | 5/2022 | Kim | H01M 10/6556 |
| 2022/0185088 A1* | 6/2022 | Zhang | H01M 50/244 |
| 2022/0219522 A1* | 7/2022 | Kimura | B62D 21/02 |
| 2022/0250458 A1* | 8/2022 | Kimura | B62D 21/02 |

FOREIGN PATENT DOCUMENTS

| | | | | |
|---|---|---|---|---|
| CN | 208559502 U | | 3/2019 | |
| CN | 112020448 A | | 12/2020 | |
| DE | 10 2011 109 025 A1 | | 4/2012 | |
| DE | 10 2016 113 759 A1 | | 4/2017 | |
| DE | 102016113759 A1 | * | 4/2017 | |
| DE | 10 2017 102 064 A1 | | 3/2018 | |
| EP | 2 554 420 A1 | | 2/2013 | |
| JP | 49-15112 A | | 2/1974 | |
| JP | 11-120975 A | | 4/1999 | |
| JP | 2012-96557 A | | 5/2012 | |
| JP | 2014-34227 A | | 2/2014 | |
| JP | 2016-113063 A | | 6/2016 | |
| JP | 2016113063 A | * | 6/2016 | |
| JP | 2017-226353 A | | 12/2017 | |
| JP | 2018-103765 A | | 7/2018 | |
| JP | 2018103765 A | * | 7/2018 | B60K 1/04 |
| JP | 2018-187976 A | | 11/2018 | |
| JP | 2019-26050 A | | 2/2019 | |
| JP | 2019026050 A | * | 2/2019 | B60B 35/124 |
| WO | WO-2020003836 A1 | * | 1/2020 | |
| WO | WO-2020241036 A1 | * | 12/2020 | B60K 1/04 |
| WO | WO-2021010080 A1 | * | 1/2021 | B60K 1/04 |

OTHER PUBLICATIONS

English-language Extended European Search Report issued in European application No. 20813891.7-1012 dated Jun. 16, 2023 (Seven (7) pages).

PCT/JP2020/014783, International Search Report dated Jun. 16, 2020 (Two (2) pages).

Chinese Office Action issued in Chinese application No. 202080040157.0 dated Mar. 1, 2023, with partial English translation (Fourteen (14) pages).

Japanese-language Japanese Office Action issued in Japanese Application No. 2023-073326 dated Feb. 21, 2024, with English translation (6 pages).

* cited by examiner

ELECTRIC TRUCK FRAME

TECHNICAL FIELD

The present invention relates to an electric truck frame.

BACKGROUND ART

In the past, a development of electric vehicles, such as electric cars using a motor as a drive power source instead of an internal combustion engine and hybrid cars using a combination of the internal combustion engine and the motor, has been making progress, focusing on a viewpoint of environmental load reduction. In particular, a drive battery for driving the motor is mounted in these electric vehicles, and by supplying electric power from the battery to the motor, the power necessary to drive the vehicle can be obtained. In recent years, with regard to such electric vehicles, the development has been carried out also in the field of commercial vehicles such as trucks. For example, Patent Document 1 discloses a holding structure for holding a drive battery pack on a ladder frame of an electric truck.

In order to secure a distance to empty, the electric truck needs to mount a battery with a larger capacity than that of a hybrid truck or any other truck. In the electric truck, it is easier to secure a space occupied by the battery if the battery is provided between the side rails of the ladder frame rather than provided on an outer side in a vehicle width direction with respect to the side rails of the ladder frame.

CITATION LIST

Patent Document

[Patent Document 1] Japanese Patent Laid-Open No. 2016-113063

SUMMARY OF THE INVENTION

Problem to be Solved by the Invention

Meanwhile, in a ladder frame of conventional trucks, in order to secure the feasibility of the frame by realizing both strength that supports a heavy load mounted on the vehicle and ensures the toughness of the vehicle itself and rigidity that allows a predetermined amount of deformation, a plurality of cross members are provided at predetermined positions in a pair of side rails. However, when the conventional truck ladder frame is used in an electric truck, a battery placement between the side rails is restricted to a space that does not interfere with the cross members. As a result, the capacity of the battery cannot be increased sufficiently.

The present invention has been made in view of such a problem, and an object of the present invention is to provide an electric truck frame that is capable of increasing the capacity of a battery placed between the side rails while securing the feasibility as a truck frame.

[Arrangement for Solving the Problem]
<First Aspect of the Present Invention>

An electric truck frame according to a first aspect of the present invention in which a pair of side rails supporting a cab is coupled by a plurality of cross members, the electric truck frame made for an electric truck driven by electric power supplied from a battery placed between the pair of side rails at a vehicle rear side of the cab, the side rails include a plurality of elastic support sections that elastically support both ends of the battery in a vehicle width direction in a battery region in which the battery is placed between the pair of side rails, and the cross members are prohibited from being placed in the battery region.

In the electric truck, a battery supplying the electric power necessary for driving a vehicle for travelling is provided between side rails. For this reason, in an electric truck frame, a battery region for placing the battery is secured, and a plurality of elastic support sections for elastically supporting the battery are provided in each of the pair of side rails. Therefore, when the batter is placed, by elastically coupling the left and right side rails via the elastic support sections, the electric truck frame is expected to reduce the stress with respect to twisting and lateral bending of the frame while improving the rigidity of the frame itself.

Further, in the electric truck frame, since the cross members are prohibited from being placed in the battery region, a placement of the battery mounted in the electric truck does not interfere with a placement of the cross members, and a space for increasing the capacity of a battery can be secured. Therefore, the electric truck frame according to a first aspect of the present invention is capable of increasing the capacity of the battery placed between the side rails while securing the feasibility as a truck frame that realizes the rigidity and the strength.

<Second Aspect of the Present Invention>

In the electric truck frame according to a second aspect of the present invention, among the plurality of cross members, the cross member placed at a vehicle front side of the battery region may have a flat shape having a smaller width in a vehicle height direction than that of the side rails, and may be placed at an upper side in the vehicle height direction between the pair of side rails in the first aspect of the present invention described above.

The electric truck frame according to the second aspect of the present invention has a shape and a placement in which the cross member placed at the vehicle front side of the battery region has a space provided at the lower side in the vehicle height direction between the side rails. For this reason, for example, when a device attached to the battery, such as a power distribution unit, is placed at the front of the battery, the space can be effectively utilized while the device and the cross member do not interfere with each other. As a result, a larger battery region can be secured.

<Third Aspect of the Present Invention>

In the electric truck frame according to a third aspect of the present invention, the elastic support sections may be provided on an outside of the side rails in the vehicle width direction in the first or the second aspect of the present invention.

In the electric truck frame according to the third aspect of the present invention, since a plurality of elastic support sections for suspending the battery on the side rails are provided on the outside of the side rails in the vehicle width direction, an occupied space of the battery can be maximized.

<Fourth Aspect of the Present Invention>

In the electric truck frame according to a fourth aspect of the present invention, each of the pair of side rails may include the elastic support sections at a plurality of positions spaced in a vehicle longitudinal direction in any one of the first to the third aspects of the present invention.

In the electric truck frame according to the fourth aspect of the present invention, in each of the pair of side rails, a plurality of the elastic support sections are provided at least at a plurality of positions spaced in a vehicle longitudinal direction, which makes the reduction in stress with respect to twisting and lateral bending of the frame more effective.

<Fifth Aspect of the Present Invention>

In the electric truck frame according to a fifth aspect of the present invention, the battery region may extend to the cross member provided in a rear wheel drive region among the plurality of cross members in any one of the first to the fourth aspects of the present invention.

In the electric truck frame according to the fifth aspect of the present invention, for example, a battery region occupied by the battery can be expanded by, for example, extending the battery region to the cross member provided in a rear wheel drive region in which a drive unit for driving the electric truck is placed.

MODE FOR CARRYING OUT THE INVENTION

With reference to the accompanying drawings, the embodiments of the present invention will be described in detail. The present invention is not restricted to the description given below; it can be carried out with any desired alteration that does not change the essentials thereof. The drawings used in explanation of the embodiments show components schematically; in order to help understanding, they may contain partial emphasis, enlargement, contraction, omission or the like, and thus, may not necessarily show the respective components on an accurate scale and in an accurate shape.

First Embodiment

Figure 1:
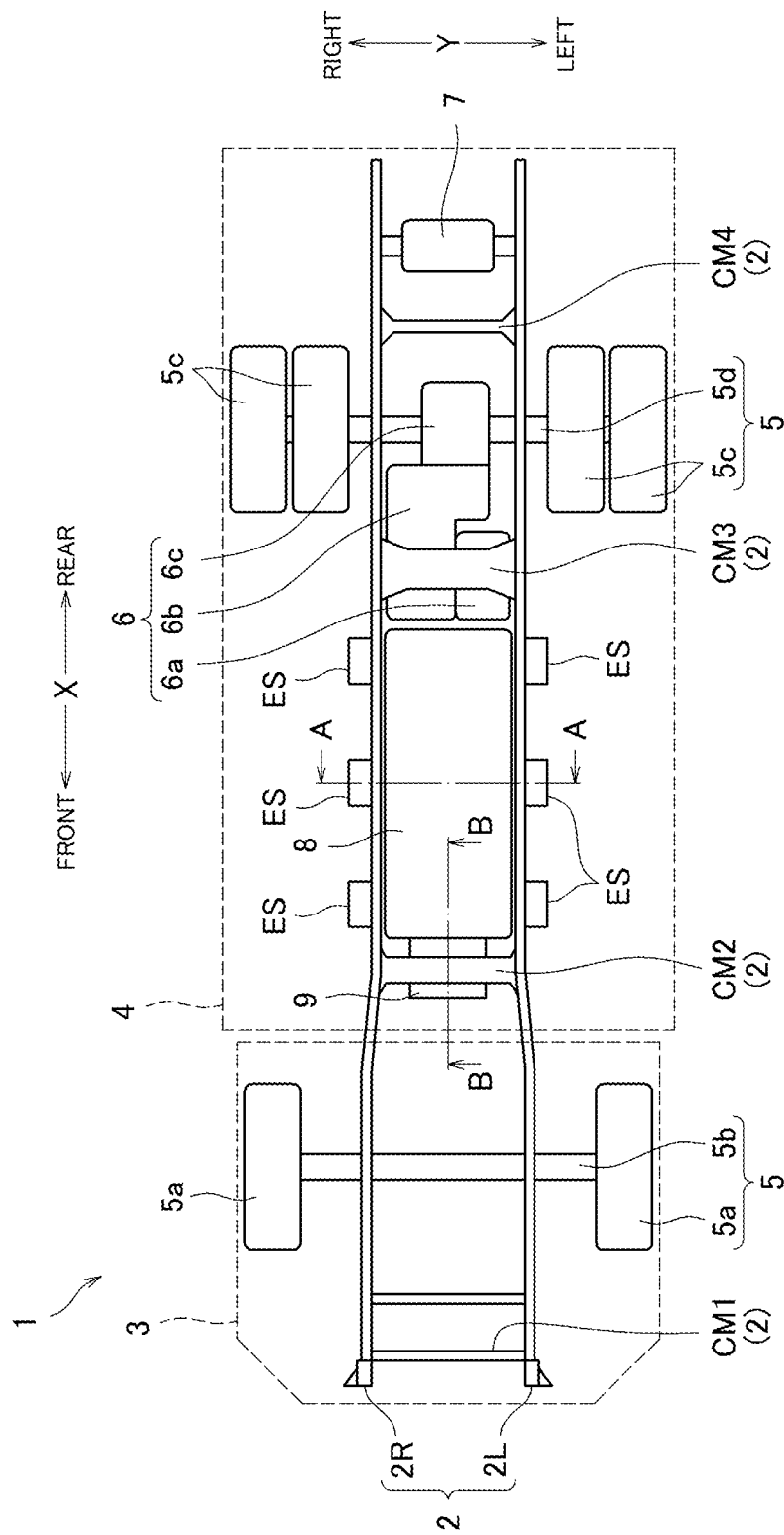
FIG. 1 is a top view schematically showing an overall configuration of an electric truck provided with an electric truck frame according to a first embodiment of the present invention.

FIG. 1 is a top view schematically showing an overall configuration of an electric truck 1 provided with an electric truck frame 2 according to a first embodiment of the present invention. As shown in FIG. 1, an electric truck 1 according to the present embodiment includes an electric truck frame 2, a cab 3, a load box 4, a wheel mechanism 5, a drive unit 6, a drive power supply unit 7, a battery 8 and a PDU 9. Here, FIG. 1 is represented as a top view when seeing through the cab 3 and the load box 4 from a top surface of the electric truck 1.

The electric truck frame 2 includes a left side rail 2L and a right side rail 2R as a pair of side rails, and a plurality of cross members CM1 to CM4. The left side rail 2L and the right side rail 2R extend in a vehicle longitudinal direction X of the electric truck 1 and are arranged parallel to each other in a vehicle width direction Y. The plurality of cross members CM1 to CM4 couples the left side rail 2L and the right side rail 2R at their respective positions. That is, the electric truck frame 2 constitutes a so-called ladder-type frame. Then, the electric truck frame 2 supports the cab 3, the load box 4, the drive unit 6, the drive power supply unit 7, the battery 8, and other heavy objects mounted in the electric truck 1.

The cab 3 is a structure including a driver's seat (not shown), and is supported at the upper front of the electric truck frame 2. Meanwhile, the load box 4 is a structure on which a load or the like transported by the electric truck 1 is loaded, and is provided at the upper rear of the electric truck frame 2.

In the present embodiment, the wheel mechanism 5 includes left and right front wheels 5a located at the vehicle front side, a front axle 5b as an axle of the front wheels 5a, rear wheels 5c located at the vehicle rear side and placed two each on the left and right, and a rear axle 5d as an axle of the rear wheels 5c. Then, in the electric truck 1 according to the present embodiment, a drive force is transmitted such that the rear wheels 5c function as drive wheels, which makes the electric truck 1 to travel. The wheel mechanism 5 is suspended on the electric truck frame 2 via a suspension mechanism (not shown) and supports a weight of the electric truck 1.

The drive unit 6 includes a motor 6a, a reduction mechanism 6b, and a differential mechanism 6c. The motor 6a generates a drive force necessary for traveling of the electric truck 1 by being supplied with AC power from a drive power supply unit 7 to be described later. The reduction mechanism 6b includes a plurality of gears (not shown), reduces a rotational torque input from the motor 6a and outputs the rotational torque to the differential mechanism 6c. The differential mechanism 6c distributes the power input from the reduction mechanism 6b to the left and right rear wheels 5c. That is, the drive unit 6 reduces a drive torque of the motor 6a to a rotational speed suitable for traveling of the vehicle via the reduction mechanism 6b and the differential mechanism 6c, and transmits a drive force to the rear axle 5d. Thus, the drive unit 6 can rotate the rear wheels 5c via the rear axle 5d to make the electric truck 1 to travel. The drive unit 6 is suspended on the cross member CM3 at the front in a vehicle longitudinal direction X.

The drive power supply unit 7 is a so-called inverter, converts DC power supplied from the battery 8 into AC power and supplies the AC power to the motor 6a, and controls a rotational speed of the motor 6a according to an accelerator operation for the electric truck 1.

The battery 8 is a secondary battery that supplies electric power to the motor 6a as an energy source mainly for making the electric truck 1 to travel. The battery 8 internally includes a plurality of relatively large battery modules BM (see FIGS. 3 and 4) with a large capacity in order to store the electric power required for the electric truck 1. In addition, the battery 8 can also supply electric power to an electric accessory group (not shown) mounted in the electric truck 1. The configuration of the battery 8 will be described in detail later.

A PDU 9 is a so-called power distribution unit that distributes a portion of electric power output from the battery 8 to the electric accessory group (not shown). The PDU 9 is provided between the left side rail 2L and the right side rail 2R in the vehicle width direction Y and at the vehicle front side of the battery 8.

Here, the electric truck frame 2 in the present embodiment includes a plurality of elastic support sections ES that elastically support both ends of the battery 8 in the vehicle width direction Y. Three elastic support sections ES are provided on the outer side in the vehicle width direction Y for each of the left side rail 2L and the right side rail 2R (that is, six in total). However, according to a weight and a size of the battery 8, the number of the elastic support sections ES can be changed as appropriate. The detailed configuration of the plurality of elastic support sections ES will be described later.

Figure 2:
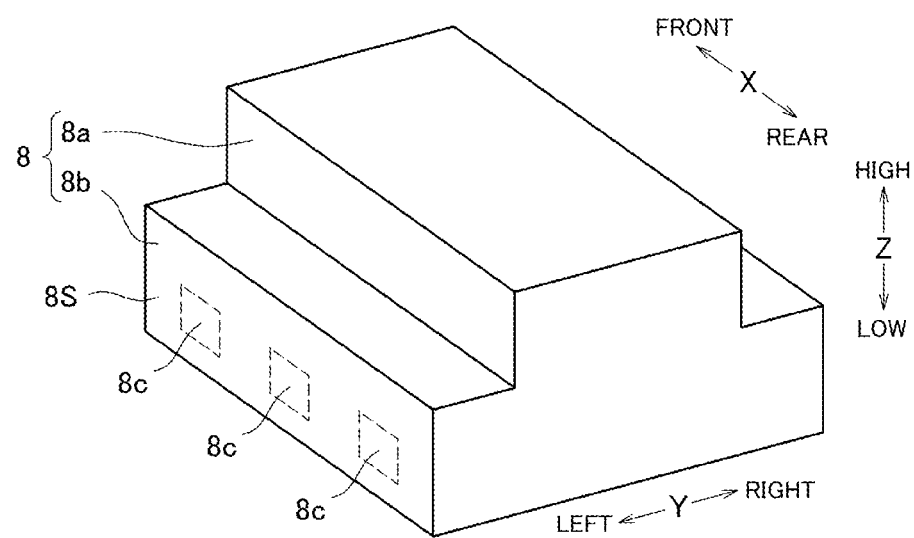
FIG. 2 is a perspective view showing an outline of a battery mounted in an electric truck.

FIG. 2 is a perspective view showing an outline of the battery 8 mounted in the electric truck 1. The battery 8 according to the present embodiment is formed such that a first battery housing section 8a and a second battery housing section 8b, which are substantially in the form of a rectangular solid having the same length in the vehicle longitudinal direction X, are integrated.

The first battery housing section 8a has a width that fits between the left side rail 2L and the right side rail 2R with respect to the vehicle width direction Y. Meanwhile, the second battery housing section 8b has a length in the vehicle width direction Y equal to or wider than that of the electric truck frame 2, and is coupled to the first battery housing section 8a from the lower side in the vehicle height direction Z.

That is, the battery 8 has a shape in which a cross-sectional shape in a plane perpendicular to the vehicle longitudinal direction X is an inverted T-shape. Then, the battery 8 is placed such that each of the left side rail 2L and the right side rail 2R passes through a difference in level generated by the difference in width between the first battery housing section 8a and the second battery housing section 8b. Therefore, the battery 8 secures the capacity of a battery by effectively utilizing a space between and below the left side rail 2L and the right side rail 2R.

The battery 8 is provided with a plurality of attachment regions 8c for connecting the elastic support sections ES on a battery side surface 8S that is an outer surface of the second battery housing section 8b in the vehicle width direction Y.

Figure 3:
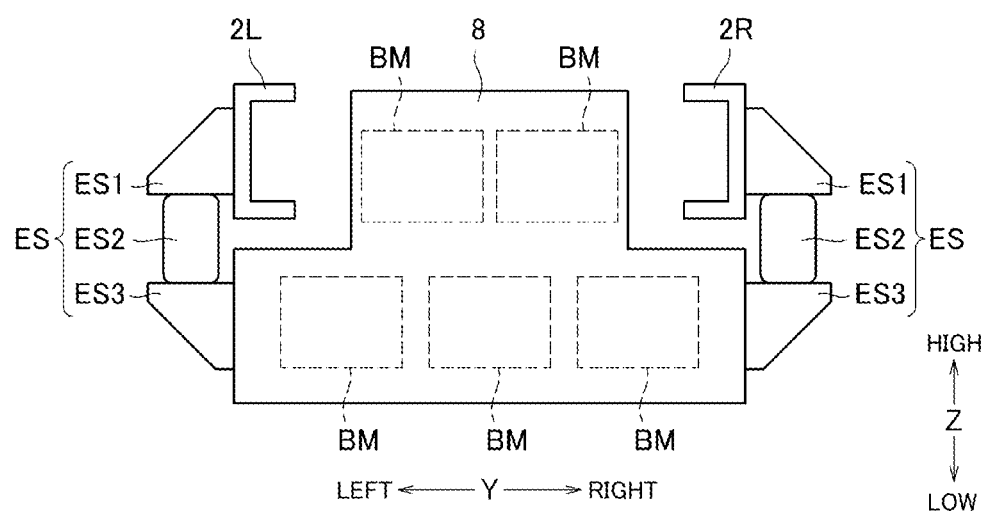
FIG. 3 is a perspective view showing a configuration and a connection mode of an elastic support section that connects the electric truck frame and the battery.

FIG. 3 is a perspective view showing a configuration and a connection mode of the elastic support section ES that connects the electric truck frame 2 and the battery 8. More specifically, FIG. 3 is a cross-sectional view of the battery 8 and the elastic support section ES when viewing a cross-section of the battery 8 and the elastic support section ES perpendicular to the vehicle longitudinal direction X from the vehicle rear side, as shown by A in FIG. 1.

Here, the battery 8 houses a plurality of battery modules BM according to the size of the battery 8. Meanwhile, various changes can be made to the shape and the placement of the battery modules BM.

The elastic support section ES includes a frame side bracket ES1, an elastic coupling member ES2 and a battery side bracket ES3. The frame side bracket ES1 is a metal mounting member and is bolted to an outer surface of the left side rail 2L and of the right side rail 2R in the vehicle width direction Y. The elastic coupling member ES2 is connected to the frame side bracket ES1 via the rubber bush at the upper part in the vehicle height direction Z and is connected to the battery side bracket ES3 at the lower part in the vehicle height direction Z. The battery side bracket ES3 is a metal attachment member, and is fixed to each of the attachment regions 8c of the battery 8 described above.

Accordingly, after the plurality of elastic support sections ES elastically suspend the battery 8 on the electric truck frame 2, even if stress is generated due to twisting or lateral bending of the frame 2 as the electric truck 1 travels, the buffer effect of the elastic support sections ES can reduce the stress transmitted to the battery 8. That is, a risk that the battery module BM as a content of the battery 8 is damaged by the stress can be reduced.

Meanwhile, the left side rail 2L and the right side rail 2R are elastically coupled to each other via the elastic support section ES and the housing of the battery 8 connected to each of the left side rail 2L and the right side rail 2R. For this reason, the plurality of elastic support sections ES reduce the stress with respect to twisting or lateral bending of the frame, while improving the rigidity of the electric truck frame 2 itself by coupling between the side rails together with the battery 8. It is therefore possible to secure the feasibility of the frame by realizing the rigidity and the reduction in stress.

Further, since the elastic support sections ES are provided on the outside of the left side rail 2L and the right side rail 2R in the vehicle width direction Y, a occupied space of the battery 8 can be maximized.

Figure 4:
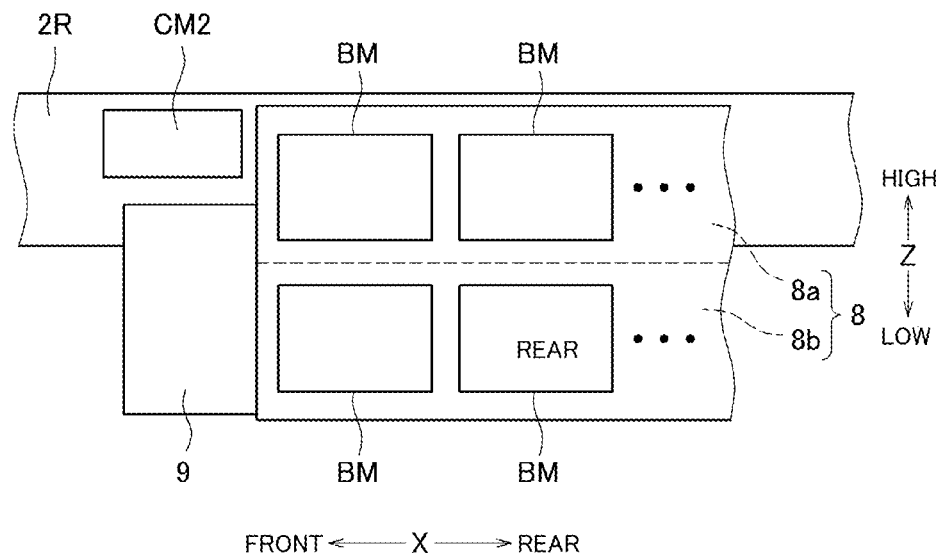
FIG. 4 is a side view of the electric truck frame shown together with a partial cross-section of the battery.

FIG. 4 is a side view of the electric truck frame 2 shown together with a partial cross-section of the battery 8. More specifically, FIG. 4 is a side view showing a relative placement of the battery 8, the PDU 9, and the cross member CM2 when viewing a cross-section of the battery 8 perpendicular to the vehicle width direction Y from the left side of the vehicle as shown by B in FIG. 1.

The battery 8 houses a plurality of battery modules BM in each of the first battery housing section 8a and the second battery housing section 8b. Further, the PDU 9 in the present embodiment is connected to the front of the battery 8 in the vehicle longitudinal direction X. Since a plurality of battery modules BM and the PDU 9 are connected with a harness not shown, the PDU 9 can collect electric power from the respective battery modules BM and distribute the electric power to a group of electric accessories (not shown) mounted in the electric truck 1.

Here, the cross member CM2 provided at the vehicle front side of the battery 8 has a flat shape having a smaller width in the height direction Z than that of left side rail 2L and right side rail 2R, and is placed at the upper side in the vehicle height direction Z between the side rails. For this reason, in the cross member CM2, a space can be provided at the lower side between the side rails, which enables the occupied space of the battery 8 to be maximized by avoiding an interference with the PDU 9 and minimizing the dead space.

A shape of the housing of the battery 8 may be changed as appropriate. For example, it may be shaped to house both of the plurality of battery modules BM and the PDU 9.

Figure 5:
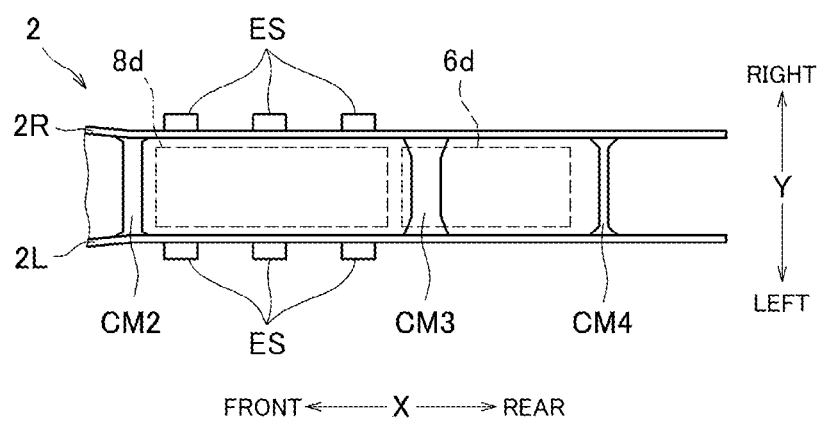
FIG. 5 is a top view partially showing the electric truck frame according to the present invention.

FIG. 5 is a top view partially showing the electric truck frame 2 according to the present invention. FIG. 5 shows the electric truck frame 2 in the lower side of the load box 4 before mounting various components.

In the electric truck frame 2, a battery region 8d in which the battery 8 is placed and a rear wheel drive region 6d in which the drive unit 6 is placed are provided side by side in the vehicle longitudinal direction X between a pair of side rails. At this time, as described above, the drive unit 6 has its front portion suspended on the cross member CM3. Therefore, the battery region 8d can be set to extend to the cross member CM3 provided in the rear wheel drive region 6d.

Accordingly, the battery region 8d that can be occupied by the battery 8 can expand a rear end in the vehicle longitudinal direction X to just before the cross member CM3. Further, the battery region 8d can expand a front end in the vehicle longitudinal direction X to just after the cross member CM3 as described above.

In the electric truck frame 2 according to the present invention, the cross members CM1 to CM4 are prohibited from being placed in the battery region 8d in which the battery 8 is placed. Therefore, in the battery region 8d, an entire space can be utilized for securing the capacity of the battery without interfering with any cross member.

Further, in the electric truck frame 2 according to the present invention, the plurality of elastic support sections ES, which elastically support the battery 8 from both sides in the vehicle width direction Y, are provided in the battery region 8d. For this reason, when the battery 8 is placed in the battery region 8d, as described above, the electric truck frame 2 can reduce the stress with respect to twisting or lateral bending of the frame while improving the rigidity of the frame itself. Accordingly, the electric truck frame 2 secures the feasibility of the frame that realizes both the rigidity and the strength even when securing a relatively large region where the cross members are prohibited from being placed in order to secure the capacity of the battery. Here, when the battery is rigidly supported by the frame, the rigidity of the frame itself is improved; however, since there is a possibility that the stress exceeding an allowable value with respect to twisting or lateral bending of the frame may be generated, the feasibility of the frame as a truck frame cannot be secured. In addition, the stress with respect to twisting or lateral bending of the frame directly affects the battery, so that the reliability of the battery cannot be secured.

Further, in each of the left side rail 2L and the right side rail 2R, the plurality of elastic support sections ES are provided at least at a plurality of positions spaced in the vehicle longitudinal direction X, which makes the reduction in stress with respect to twisting and lateral bending of the frame more effective.

As described above, when the battery 8 is placed, by elastically coupling the left and right side rails via the housing of the battery 8 and the elastic support section ES, the electric truck frame 2 according to the present invention can reduce the stress with respect to twisting and lateral bending of the frame while improving the rigidity of the frame itself. In addition, in the electric truck frame 2, since the cross members are prohibited from being placed in the battery region 8d, a placement of the battery 8 mounted in the electric truck 1 does not interfere with a placement of the cross members, and a space for increasing the capacity of the battery can be secured. Therefore, the electric truck frame 2 according to the present invention is capable of increasing the capacity of the battery placed between the side rails while securing the feasibility as a truck frame.

Second Embodiment

Next, a second embodiment of the present invention will be described. The electric truck frame 2 of the present embodiment differs from the first embodiment in configuration and placement of the plurality of elastic support sections ES in the electric truck frame 2 of the first embodiment described above. Hereinafter, the parts different from the first embodiment will be described, and the same reference numerals are given to components common to the first embodiment and the detailed description thereof will be omitted.

Figure 6:
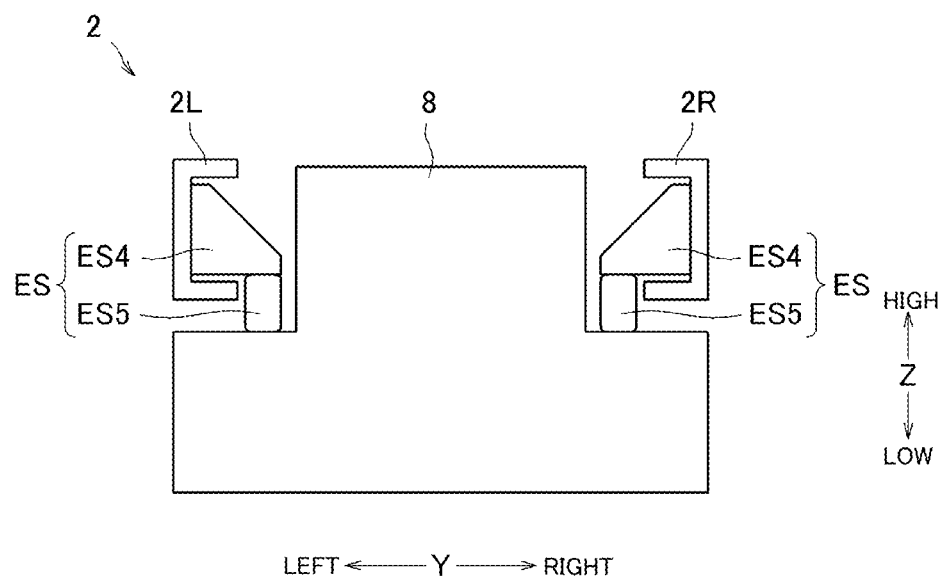
FIG. 6 is a cross-sectional view of an electric truck frame according to a second embodiment of the present invention.

FIG. 6 is a cross-sectional view of the electric truck frame 2 according to a second embodiment of the present invention. More specifically, FIG. 6 is a cross-sectional view of the battery 8 and the elastic support sections ES when viewing a cross-section of the battery 8 and the elastic support sections ES perpendicular to the vehicle longitudinal direction X from the vehicle rear side as in the case of FIG. 3. However, the battery modules BM are omitted here.

The elastic support section ES according to the second embodiment includes a frame side bracket ES4 and an elastic coupling member ES5. The frame side bracket ES4 is a metal mounting member and is bolted to an inner surface of the left side rail 2L and of the right side rail 2R in the vehicle width direction Y. The elastic coupling member ES5 is connected to the frame side bracket ES4 via the rubber bush at the upper part in the vehicle height direction Z and is connected to the housing of the battery 8 at the lower part in the vehicle height direction Z.

For this reason, as in the case of the electric truck frame 2 according to the first embodiment, the electric truck frame 2 according to the second embodiment can provide an outer space of the pair of side rails in the vehicle height direction Z while securing the feasibility of the frame that realizes the rigidity and the strength, thereby making it possible to effectively utilize the outer space for mounting other components.

Third Embodiment

Next, a third embodiment of the present invention will be described. The electric truck frame 2 of the present embodiment differs from the second embodiment in a shape of the battery 8 and a configuration of the elastic support sections ES in the electric truck frame 2 of the second embodiment described above. Hereinafter, the parts different from the second embodiment will be described, and the same reference numerals are given to components common to the second embodiment and the detailed description thereof will be omitted.

Figure 7:
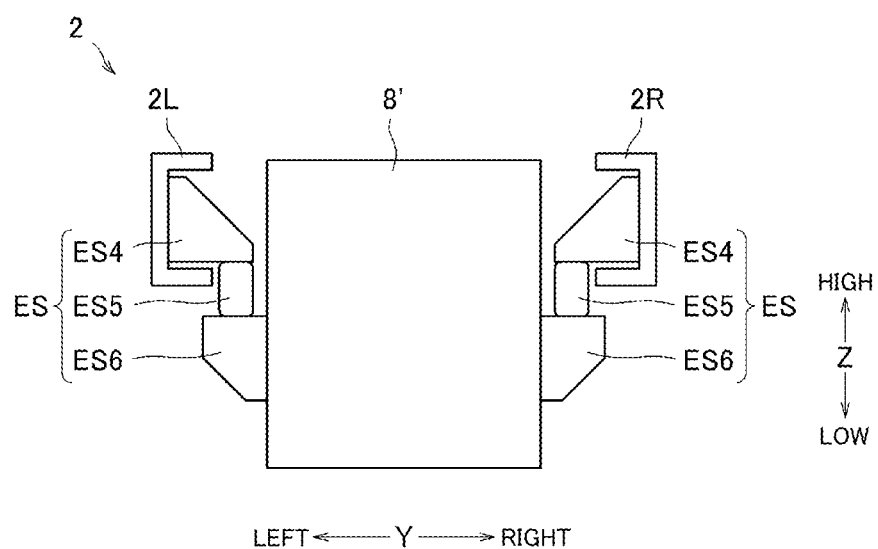
FIG. 7 is a cross-sectional view of an electric truck frame according to a third embodiment of the present invention.

FIG. 7 is a cross-sectional view of the electric truck frame 2 according to a third embodiment of the present invention. A battery 8' of the third embodiment has a rectangular cross-section perpendicular to the vehicle longitudinal direction X, and is placed more inner side than the left side rail 2L and the right side rail 2Rd with respect to the vehicle width direction Y.

Further, the elastic support section ES according to the third embodiment of the present invention includes a battery side bracket ES6 in addition to the frame side bracket ES4 and the elastic coupling member ES5 of the elastic support section ES according to the second embodiment described above. The battery side bracket ES6 is a metal mounting member, and is connected to the elastic coupling body ES5 at the upper part in the vehicle height direction Z and fixed to a side surface of the battery 8'.

For this reason, as in the case of the electric truck frame 2 according to the first embodiment, the electric truck frame 2 according to the third embodiment can secure the feasibility of the frame that realizes the rigidity and the strength regardless of the shape of the battery 8'.

REFERENCE SIGNS LIST

1 Electric truck
2 Electric truck frame
3 Cab
8 Battery
2L Left side rail
2R Right side rail
CM1 to CM4 Cross members
ES Elastic support section
8d Battery region

The invention claimed is:

1. An electric truck frame of an electric truck driven by electric power supplied from a battery, comprising:
   a pair of side rails supporting a cab are coupled by a plurality of cross members;
   wherein the battery is disposed between the pair of side rails at a rear side of the cab;
   wherein the pair of side rails include a plurality of elastic support sections that elastically support both ends of a housing of the battery in an electric truck width direction in a battery region in which the battery is disposed between the pair of side rails;
   wherein the plurality of cross members are prohibited from being placed in the battery region, and
   wherein the pair of side rails are elastically connected to each other via the housing of the battery and the elastic support sections.

2. The electric truck frame according to claim 1, wherein a cross member of the plurality of cross members placed at an electric truck front side of the battery region has a flat shape having a smaller width in an electric truck height direction than that of the pair of side rails and is placed at an upper side in the electric truck height direction between the pair of side rails.

3. The electric truck frame according to claim 1, wherein the elastic support sections are provided on an outside of the side rails in the vehicle width direction.

4. The electric truck frame according to claim 1, wherein each of the pair of side rails includes respective elastic support sections at a plurality of positions spaced in an electric truck longitudinal direction.

5. The electric truck frame according claim 1, wherein the battery region extends to a cross member of the plurality of cross members disposed in a rear wheel drive region.

* * * * *